US011827463B2

(12) United States Patent
Yogev

(10) Patent No.: US 11,827,463 B2
(45) Date of Patent: Nov. 28, 2023

(54) SYSTEM FOR STORING COMPRESSED FLUID

(71) Applicant: AUGWIND LTD., Nes Ziyona (IL)

(72) Inventor: Or Yogev, Gedera (IL)

(73) Assignee: AUGWIND LTD., Nes Ziyona (IL)

( * ) Notice: Subject to any disclaimer, the term of this patent is extended or adjusted under 35 U.S.C. 154(b) by 392 days.

(21) Appl. No.: 17/055,811

(22) PCT Filed: Jun. 16, 2019

(86) PCT No.: PCT/IL2019/050675
§ 371 (c)(1),
(2) Date: Nov. 16, 2020

(87) PCT Pub. No.: WO2019/244148
PCT Pub. Date: Dec. 26, 2019

(65) Prior Publication Data
US 2021/0206574 A1    Jul. 8, 2021

(30) Foreign Application Priority Data

Jun. 20, 2018 (IL) .......................................... 260175

(51) Int. Cl.
*B65G 5/00* (2006.01)
*E04H 7/18* (2006.01)
*F17C 1/00* (2006.01)

(52) U.S. Cl.
CPC ................. *B65G 5/00* (2013.01); *E04H 7/18* (2013.01); *F17C 1/007* (2013.01);
(Continued)

(58) Field of Classification Search
CPC .... B65G 5/00; F17C 1/007; F17C 2223/0123; F17C 2201/018; F17C 2203/0685;
(Continued)

(56) References Cited

U.S. PATENT DOCUMENTS

| 3,603,096 A | 9/1971 | Wells et al. |
| 4,165,945 A | 8/1979 | Despois et al. |

(Continued)

FOREIGN PATENT DOCUMENTS

| CH | 458695 | 6/1968 |
| EP | 2832666 | 8/2013 |
| WO | 2018/092122 A1 | 5/2018 |

*Primary Examiner* — Carib A Oquendo
(74) *Attorney, Agent, or Firm* — Browdy and Neimark, PLLC

(57) ABSTRACT

A storage system for storing compressed fluid is described. The system includes an excavation made in the ground, a balloon arrangement mounted within the excavation. The balloon arrangement includes a rebar cage and an inflatable balloon arranged within the rebar cage. The inflatable balloon has a middle portion and two end portions. One end portion includes a balloon inlet port, whereas the other end portion includes a balloon outlet port. The system also includes a filling material fully surrounding the inflatable balloon and configured for providing further reinforcement in conjunction with the rebar cage to the inflatable balloon, and for anchoring the inflatable balloon to the excavation. The system also includes a gas pipe assembly including an inlet gas pipe coupled to the balloon inlet port for filling the inflatable balloon with compressed fluid, and an outlet gas pipe coupled to the balloon output port for releasing the compressed fluid.

12 Claims, 2 Drawing Sheets

(52) U.S. Cl.
CPC .. *F17C 2201/018* (2013.01); *F17C 2201/035* (2013.01); *F17C 2203/012* (2013.01); *F17C 2203/0617* (2013.01); *F17C 2203/0639* (2013.01); *F17C 2203/0685* (2013.01); *F17C 2205/0107* (2013.01); *F17C 2205/0126* (2013.01); *F17C 2209/221* (2013.01); *F17C 2221/031* (2013.01); *F17C 2270/0147* (2013.01)

(58) Field of Classification Search
CPC ....... F17C 2270/0147; F17C 2201/035; B65D 90/046; B65D 2590/046; B65D 88/1606; Y02E 70/30
See application file for complete search history.

(56) References Cited

U.S. PATENT DOCUMENTS

| | | | |
|---|---|---|---|
| 5,052,856 | A | 10/1991 | Tek |
| 5,542,785 | A * | 8/1996 | Cloud ..................... E02D 5/34 249/83 |
| 7,000,800 | B2 * | 2/2006 | Boudry ................. B65D 90/02 220/567.1 |
| 9,470,365 | B1 | 10/2016 | Atkinson et al. |
| 9,562,521 | B2 | 2/2017 | Yogev |
| 2002/0148194 | A1 | 10/2002 | Miller |
| 2008/0209918 | A1 * | 9/2008 | White ................... F17C 13/026 62/50.1 |
| 2010/0307147 | A1 | 12/2010 | Ivy et al. |
| 2011/0305409 | A1 * | 12/2011 | Russell ................ B65D 90/046 29/402.09 |

\* cited by examiner

SYSTEM FOR STORING COMPRESSED FLUID

TECHNOLOGICAL FIELD

This invention relates generally to a system for storing and utilization of compressed fluid, and more specifically to a system in which compressed fluid is stored underground and later utilized as energy.

BACKGROUND

It is known that compressed gas can be stored and utilized for many purposes. For example, stored compressed gas can be utilized in the glass and plastic container industry. However, consumption of compressed air in a glass and plastic container production plant is erratic, due to the nature of operation of plastic injection machines using compressed air. Each injection machine requires a short burst of high pressure air every few seconds (one burst per injection). When several of such machines are arranged in a production line, the air consumption profile is unsteady and erratic. A typical plant includes a compression train in which motor-driven compressors compress a certain gas, such as air. Due to the unsteady and erratic consumption profile of compressed air, operation of compressors, in order to supply high pressure air, results in long and often occurring idle time periods, hence energy waste. The erratic behavior of the consumption profile can be mitigated by increasing operating pressure, that likewise results in energy waste. Therefore, using a high volume tank containing and storing compressed air can provide a solution which can overcome the abovementioned problems.

Moreover, the stored potential energy of compressed gas can be utilized for generation of electrical power. The potential energy can, for example, be collected from natural energy sources which are effectively inexhaustible and are abundantly available throughout the world in various forms, such as wind, solar, tidal and wave energy. The energy obtained from natural energy sources can be stored in the form of potential energy of compressed gas, so as to be releasable during periods of power demand, as required. Accordingly, high pressure tanks are required for storing the compressed gas.

Various compressed air storage systems are generally known for the purpose of storing compressed gas. Gas storage tanks can, for example, be constructed on the ground surface, under the ground, and under water.

Gas storage tanks, which are built on the ground, have proven to be not economically viable when high volumes are required. Moreover, they require a high level of maintenance and must accommodate many safety regulations.

In urban areas, it is common to build underground compressed gas tanks in order to accomplish effective use of the ground surface in regions where the underground construction is placed, and to preserve the site's appearance.

For example, U.S. Pat. Appl. Publ. No. 2010/307147 describes a system for storing energy that includes a buried flexible bladder. The bladder is covered with an overfill of earth, stones, or any other material. The weight of the overfill above the bladder pressurizes a fluid stored in the bladder. As the fluid fills the bladder, it expands and lifts the mass of the overfill against gravity. The system will store the energy required to lift the overfill. When desired, the fluid can be released from the bladder, and the gravitational pressure of the overfill above the bladder will force the fluid out of the bladder and into an exit pipe connected to the bladder. Upon release, the volume of the bladder is decreased.

U.S. Pat. No. 9,562,521 describes a compressed air storage system for storing compressed air provided by an air compressing system. The system includes an underground pressure tank having a cavity arranged in a borehole made in the ground, and an inflatable balloon arranged in the cavity configured for storing the compressed air. The inflatable balloon is surrounded by compacted filling material placed between the inflatable balloon and an inner surface of the borehole.

SUMMARY

Despite the prior art in the area of underground systems for storing and utilization of compressed gas, there is still a need in the art for further improvement in order to provide a more economical and low-cost gas storage system and method for construction thereof.

It would also be advantageous to have an improved system and method which can effectively utilize available energy from wind turbines and other power generation systems, and store it for later use.

The present invention partially eliminates disadvantages of prior art systems for storing and utilization of compressed gas and provides a novel compressed fluid storage system for storing compressed gas or liquid. The compressed fluid storage system includes a storage system for storing compressed fluid, such as gas and/or liquid.

According to an embodiment of the present invention, the compressed fluid storage system includes an excavation made in the ground. The excavation has a shape of an inverted rectangular trapezoidal prism. The compressed fluid storage system also includes a balloon arrangement mounted within the excavation.

According to an embodiment of the present invention, the balloon arrangement includes a rebar cage arranged within the excavation and an inflatable balloon arranged within the rebar cage. The inflatable balloon is configured for storing the compressed fluid. The rebar cage is configured to provide reinforcement to the inflatable balloon.

The inflatable balloon has a middle portion and two end portions. One end portion includes a balloon inlet port for providing access to an inner volume of the inflatable balloon, whereas the other end portion includes a balloon outlet port for releasing the compressed fluid from the inner volume.

According to an embodiment of the present invention, the compressed fluid storage system further includes a filling material placed within a volume between the inflatable balloon, bottom and walls of the excavation. The filling material extends from the bottom up to a top of the excavation, thereby fully surrounding the inflatable balloon. The filling material is in a rigid and immobile state, and provides reinforcement to the inflatable balloon. The filling material also anchors the inflatable balloon to the excavation.

According to an embodiment of the present invention, the compressed fluid storage system also includes a gas pipe assembly. The gas pipe assembly includes an inlet gas pipe and an outlet gas pipe. The inlet gas pipe is coupled to the balloon inlet port and is configured for filling the inflatable balloon with the compressed fluid, while the outlet gas pipe is coupled to the balloon output port, and is configured for releasing the compressed fluid.

According to an embodiment of the present invention, the rebar cage includes a plurality of rebar rods extending along the inflatable balloon between the two end portions, and rebar hoops configured for binding the rebar rods to form a framework of the rebar cage.

According to an embodiment of the present invention, the rebar hoops are bound to the rebar rods by welding, thereby forming a weldment structure.

According to another embodiment of the present invention, the rebar hoops are bound to the rebar rods by tying them by using steel wires, thereby forming a rigid structure.

The filling material can also act as an adhesive to attach the rebar hoops to the rebar rods thereby forming a rebar cage.

According to an embodiment of the present invention, the middle portion of the inflatable balloon has a cylindrical shape which is tapered with contraction at the two end portions towards the balloon inlet and outlet ports. In this case, the rebar rods can follow an outer contour of the inflatable balloon to conform to its shape. In turn, diameters of the rebar hoops can gradually decrease at the two end portions of the inflatable balloon with contraction towards the balloon inlet and outlet ports.

According to an embodiment of the present invention, the gas pipe assembly further includes a drainage pipe extending into the volume of the inflatable balloon.

According to an embodiment of the present invention, a method for fabrication of a storage system for storing compressed fluid includes providing an excavation in the ground having a shape of an inverted rectangular trapezoidal prism. A balloon arrangement configured for storing the compressed fluid is provided and mounted within the excavation. The balloon arrangement includes a rebar cage arranged within the excavation and an inflatable balloon arranged within the rebar cage.

According to an embodiment of the present invention, the inflatable balloon has a middle portion and two end portions. One end portion includes a balloon inlet port for providing access to an inner volume of the inflatable balloon, whereas the other end portion includes a balloon outlet port for releasing the compressed fluid from the inner volume.

According to an embodiment of the present invention, a filling material is provided and placed within a volume between the inflatable balloon, bottom and walls of the excavation to extending from the bottom up to a top of the excavation, thereby to fully surround the inflatable balloon. The filling material is in a rigid and immobile state, and configured for providing reinforcement to the inflatable balloon and for anchoring the inflatable balloon to the excavation. In addition, the filling material acts as an adhesive between the rebar rods and the rebar hoops.

According to an embodiment of the present invention, a gas pipe assembly is provided. The gas pipe assembly includes an inlet gas pipe configured for filling the inflatable balloon with the compressed fluid and an outlet gas pipe configured for releasing the compressed fluid. The inlet gas pipe is coupled to the balloon inlet port and the outlet gas pipe is coupled to the balloon output port.

According to an embodiment, the method of producing the fluid storage system includes providing a drainage pipe and provide access of the drainage pipe into the volume of the inflatable balloon.

It should be understood that the system of the present invention is not limited to a gas storage application, but can also be used for storing any type of fluid at low and/or high pressure.

There has thus been outlined, rather broadly, the more important features of the invention so that the detailed description thereof that follows hereinafter may be better understood, and the present contribution to the art may be better appreciated. Additional details and advantages of the invention will be set forth in the detailed description.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
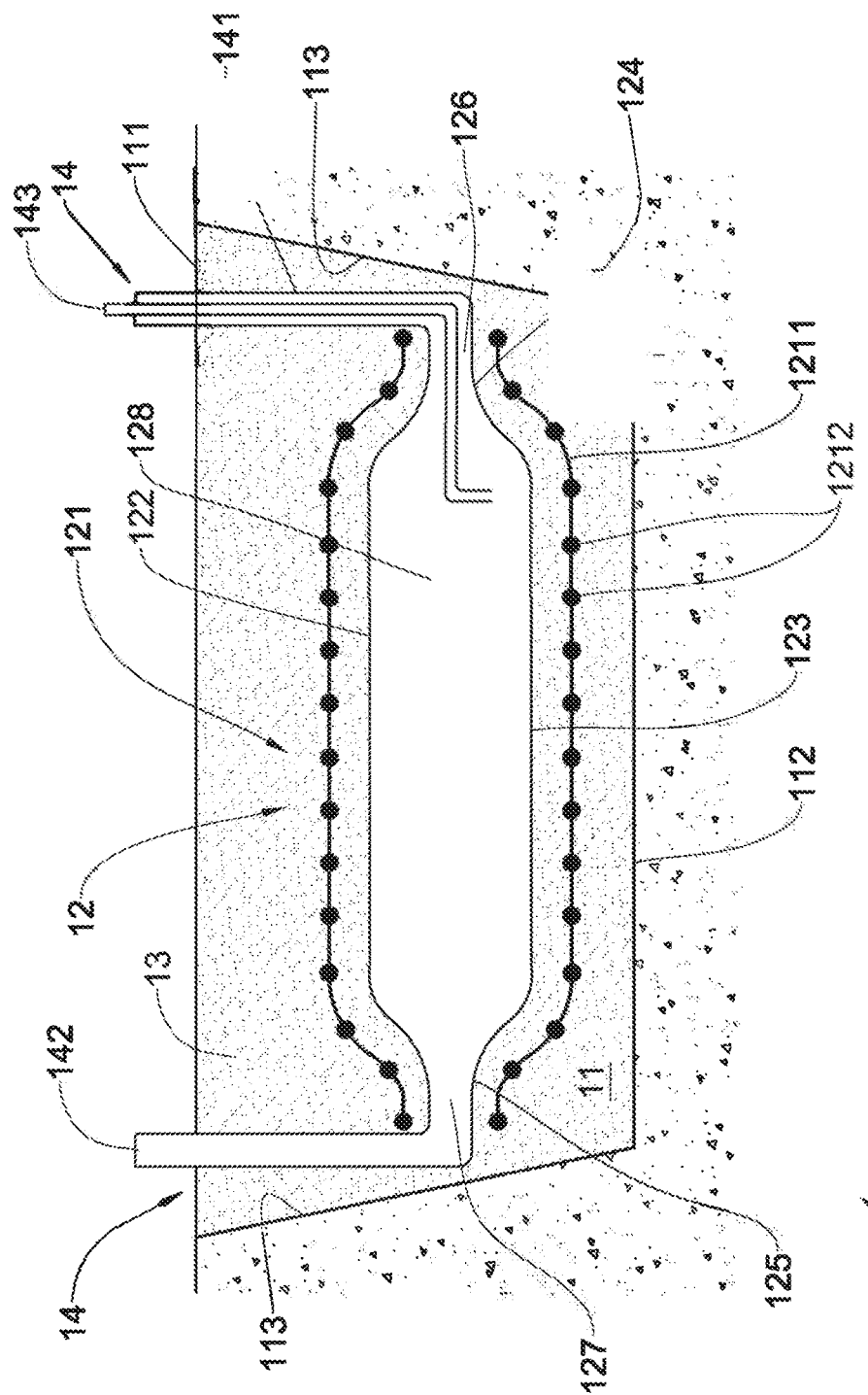
FIG. 1A illustrates a schematic longitudinal side cross-sectional view of a compressed fluid storage system, according to an embodiment of the present invention.

The principles and operation of the underground compressed gas storage system according to the present invention may be better understood with reference to the drawings and the accompanying description. It should be understood that these drawings are given for illustrative purposes only and are not meant to be limiting. It should be noted that the figures illustrating various examples of the system of the present invention are not to scale, and are not in proportion, for purposes of clarity. The same reference numerals and alphabetic characters are utilized for identifying those components which are common in the hydro-pneumatic energy storage system and its components shown in the drawings throughout the present description of the invention. Examples of constructions are provided for selected elements. Those versed in the art should appreciate that many of the examples provided have suitable alternatives which may be utilized.

Figure 1B:
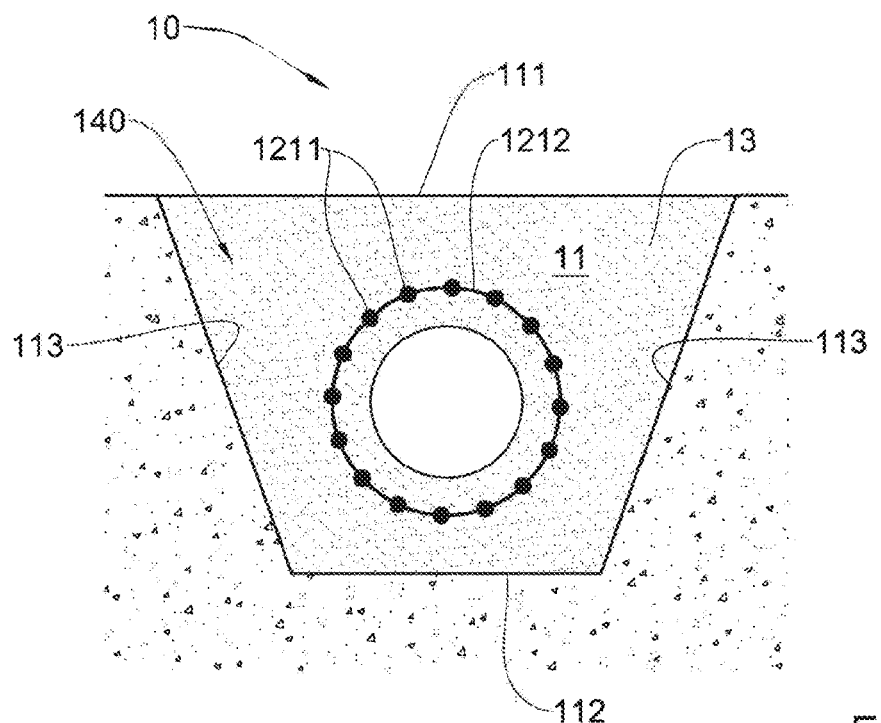
FIG. 1B illustrates a schematic transverse side cross-sectional view of the compressed fluid storage system of FIG. 1A, according to an embodiment of the present invention.

Referring to FIGS. 1A and 1B a schematic longitudinal and transverse side cross-sectional views of a compressed fluid storage system 10 are illustrated, correspondingly, according to an embodiment of the present invention. The compressed fluid storage system 10 of the present invention can be successfully employed for storing compressed gas, compressed liquid and any other fluid as well, including a mixture of gases and/or liquids.

The compressed fluid storage system 10 includes an excavation 11 made in the ground. The excavation 11 has a shape of an inverted rectangular trapezoidal prism, and has a predetermined depth, and predetermined lengths and widths at a top 111 and at a bottom 112, correspondingly. It should be understood that differences between the lengths and widths of the excavation 11 at the top 111 and at the bottom 112 are determined by the soil friction angle and depend on the friction shear resistance of the soil.

A depth of the excavation 11 can, for example, be in the range of about 1 meter to 7 meters. A length of the excavation 11 can, for example, be in the range of about 5 meters to 50 meters A bottom width of the excavation can, for example, be in the range of 0.5 meters to 5 meters, a top width of the excavation can, for example, be in the range of 1.5 meters to 10 meters.

According to an embodiment of the present invention, the compressed fluid storage system 10 includes a balloon arrangement 12 mounted within the excavation 11.

Figure 2:
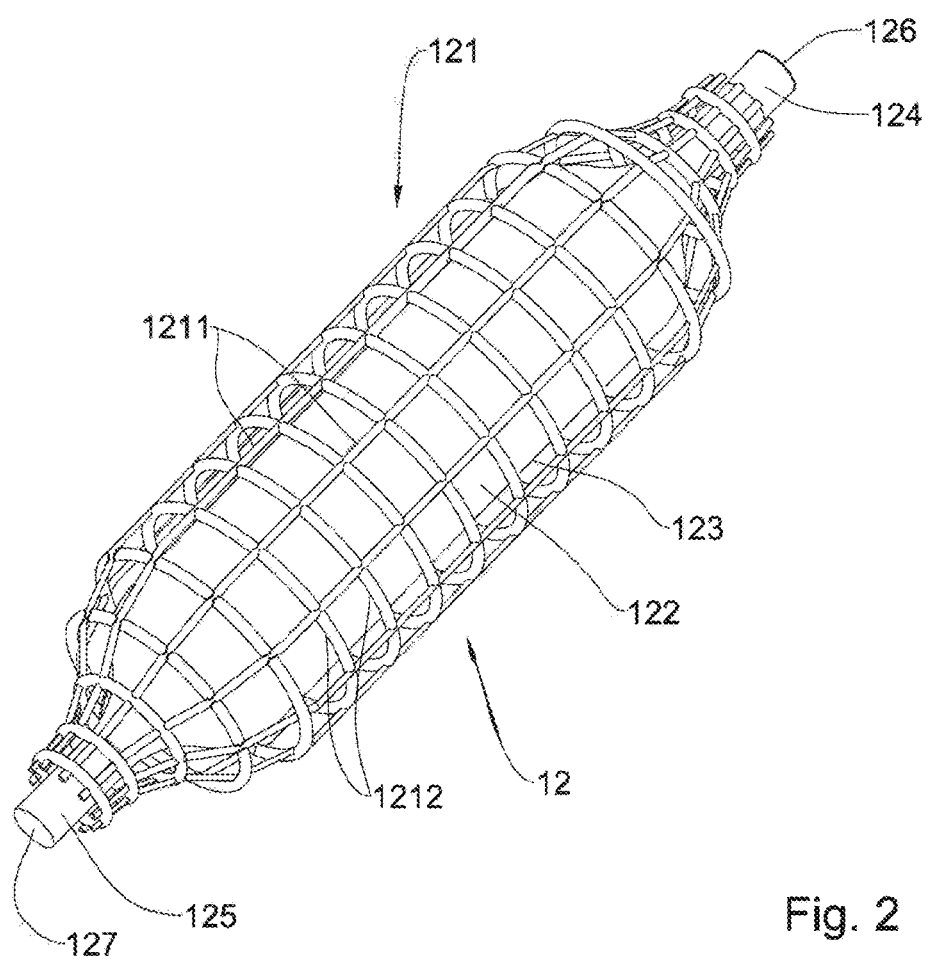
FIG. 2 illustrates an elevated perspective view of a balloon arrangement of the compressed fluid storage system of FIG. 1A, according to an embodiment of the present invention.

FIG. 2 illustrates an elevated perspective view of a balloon arrangement 12 of the compressed fluid storage system of FIG. 1A, according to an embodiment of the present invention. Referring to FIGS. 1A and 2 together, the balloon arrangement 12 includes a rebar cage 121 arranged within the excavation 11 and an inflatable balloon 122 arranged within the rebar cage 121. A distance between a ground surface and the rebar cage 121 in the excavation 11 can, for example, be in the range of 0.2 meters to 2 meters The inflatable balloon 122 is configured for storing compressed gas or any other fluid. The inflatable balloon 122 has a middle portion 123 and two end portions 124 and 125. One end portion 124 includes a balloon inlet port 126 configured for providing access to an inner volume 128 of the inflatable balloon 122. The other end portion 125 includes a balloon outlet port 127 for releasing the compressed gas from the inner volume 128.

The inflatable balloon 122 can, for example, be made of an elastic, durable, strong plastic or rubber material having a braid or other reinforcement that can sustain relatively large deformation. The deformation can, for example, be in the range of about 10% to 500% volume change. It is also required that the balloon's material can resist underground chemical reactions (e.g. soil deposits) and moisture (e.g. rain) infiltration.

According to an embodiment of the present invention, the rebar cage 121 includes a plurality of rebar rods 1211 extending along the inflatable balloon 122 between the two end portions 124 and 125, and rebar hoops 1212 configured for binding the rebar rods 1211 to form a framework of the rebar cage 121. The rebar hoops 1212 and the rebar rods 1211 can, for example, be made from steel and have a bar cross-sectional diameter in the range of about 1 cm to 3 cm. The rebar hoops 1212 can, for example, be bound to the rebar rods 1211 by welding, thereby to form a grid weldment structure. Alternatively, the rebar hoops 1212 are bound to the rebar rods 1211 by tying them by using steel wires, thereby forming a rigid structure.

A size of a grid cell of the weldment structure can, for example, be in the range of about 5 cm to 30 cm. It should be noted that fiber-reinforced plastic rebar can also be used in high-corrosion environments.

In the present invention, the term "about" means within a statistically meaningful range of a value. The allowable variation encompassed by the term "about" depends on the particular system under consideration, and can be readily appreciated by one of ordinary skill in the art. This approximation for the purpose of the present invention can, for example, be interpreted so as to include an error of 20% at least, as long as there is no considerable change in the performance of the gas storage system 10 due to the deviation.

According to an embodiment of the present invention, the compressed gas storage system 10 also includes a filling material 13 placed within a volume 14 between the inflatable balloon 122, the bottom 112 and walls 113 of the excavation 11. The filling material 13 extends from the bottom 112 up to the top 111 of the excavation 11, and fully surrounds the inflatable balloon 122. The filling material 13 is in a rigid and immobile state, and is configured for providing reinforcement in conjunction with the rebar cage to the inflatable balloon 122 and for anchoring the inflatable balloon 122 to the excavation 11. Examples of a filling material suitable for the purpose of the invention include, but are not limited to, a cement based filling material (e.g., grout), concrete, flowable fill, dirt, or any type of cement mixture.

According to an embodiment of the present invention, the compressed gas storage system 10 also includes a gas pipe assembly 14. The gas pipe assembly 14 includes an inlet gas pipe 141 coupled to the balloon inlet port 126 and configured for filling the inflatable balloon with the compressed fluid. The gas pipe assembly 14 also includes an outlet gas pipe 142 coupled to the balloon output port 127, and configured for releasing the compressed fluid.

According to an embodiment of the present invention, the gas pipe assembly 14 further includes a drainage pipe 143 extending into the bottom part of the volume of the inflatable balloon 122. The purpose of the drainage pipe 143 is to pump out the fluids (e.g., water, oil, etc.) that can be condensed from the gas as a result of condensation during operation. As shown in FIG. 1A, the drainage pipe 143 can be arranged within the lumen of the inlet gas pipe 141, however other configurations are also contemplated. For example, the drainage pipe 143 can be arranged within the outlet gas pipe 142, or may be a pipe separated from the inlet and outlet gas pipes.

According to an embodiment of the present invention, the middle portion 123 of the inflatable balloon 122 has a cylindrical shape which is tapered with contraction at the two end portions 124 and 125 towards the balloon inlet and outlet ports 126 and 127 respectively. In this case, the rebar rods 1211 may follow an outer contour of the inflatable balloon 122 to conform to its shape. In turn, diameters of the rebar hoops of the rebar cage 121 may gradually decrease at the two end portions 124 and 125 with contraction towards the balloon inlet and outlet ports 126 and 127 thereby providing additional reinforcement to the inflatable balloon 122 at its ends.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

Also, it is to be understood that the phraseology and terminology employed herein are for the purpose of description and should not be regarded as limiting.

Finally, it should be noted that the words "comprising", "having" and "including" as used throughout the appended claims are to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A storage system for storing compressed fluid, comprising:
    an excavation made in a ground having a shape of an inverted rectangular trapezoidal prism;

a balloon arrangement mounted within the excavation, the balloon arrangement comprising:
a rebar cage arranged within the excavation; and
an inflatable balloon arranged within the rebar cage and configured for storing the compressed fluid, said inflatable balloon having a middle portion and two end portions, one end portion of said two end portions includes a balloon inlet port for providing access to an inner volume of the inflatable balloon, whereas the other end portion includes a balloon outlet port for releasing the compressed fluid from the inner volume;
a filling material placed within a volume between the inflatable balloon, bottom and walls of the excavation, and extending from the bottom up to a top of the excavation, thereby fully surrounding the inflatable balloon; said filling material being in a rigid and immobile state, and configured for providing further reinforcement in conjunction with the rebar cage to the inflatable balloon, and for anchoring the inflatable balloon to the excavation; and
a gas pipe assembly comprising:
an inlet gas pipe coupled to the balloon inlet port and configured for filling the inflatable balloon with the compressed fluid; and
an outlet gas pipe coupled to the balloon output port, and configured for releasing the compressed fluid.

2. The storage system of claim 1, wherein the rebar cage includes a plurality of rebar rods extending along the inflatable balloon between the two end portions, and rebar hoops configured for binding the rebar rods to form a framework of the rebar cage.

3. The storage system of claim 2, wherein the rebar hoops are bound to the rebar rods by welding thereby forming a weldment structure.

4. The storage system of claim 2, wherein the rebar hoops are bound to the rebar rods by tying them by using steel wires, thereby forming a rigid structure.

5. The storage system of claim 2, wherein the middle portion of the inflatable balloon has a cylindrical shape which is tapered with contraction at the two end portions and towards the balloon inlet and outlet ports.

6. The storage system of claim 5, wherein the rebar rods follow an outer contour of the inflatable balloon to conform to its shape.

7. The storage system of claim 6, wherein diameters of the rebar hoops gradually decrease at the two end portions of the inflatable balloon with contraction towards the balloon inlet and outlet ports.

8. The storage system of claim 1, wherein the gas pipe assembly further includes a drainage pipe extending into the volume of the inflatable balloon.

9. The storage system of claim 1, wherein a bottom width of the excavation is in the range of 0.5 meters to 5 meters, a top width of the excavation is in the range of 1.5 meters to 10 meters, and a depth of the excavation is in the range of 1 meter to 7 meters.

10. The storage system of claim 1, wherein a distance between a ground surface and the rebar cage in the excavation is in the range of 0.2 meters to 2 meters.

11. A method for producing of a storage system for storing compressed fluid, comprising:
providing an excavation in a ground having a shape of an inverted rectangular trapezoidal prism;
providing a balloon arrangement and mounting the balloon arrangement within the excavation, the balloon arrangement comprising:
a rebar cage arranged within the excavation; and
an inflatable balloon arranged within the rebar cage and configured for storing the compressed fluid, said inflatable balloon having a middle portion and two end portions, one end portion of said two end portions includes a balloon inlet port for providing access to an inner volume of the inflatable balloon, whereas the other end portion includes a balloon outlet port for releasing the compressed fluid from the inner volume;
providing a filling material and placing the filling material within a volume between the inflatable balloon, bottom and walls of the excavation to extend from the bottom up to a top of the excavation, thereby to fully surround the inflatable balloon; said filling material being in a rigid and immobile state, and configured for providing further reinforcement in conjunction with the rebar cage to the inflatable balloon, and for anchoring the inflatable balloon to the excavation;
providing a gas pipe assembly comprising an inlet gas pipe configured for filling the inflatable balloon with the compressed fluid and an outlet gas pipe configured for releasing the compressed fluid; and
coupling the inlet gas pipe to the balloon inlet port and the outlet gas pipe to the balloon output port.

12. The method of claim 11, further comprising providing a drainage pipe and providing access of the drainage pipe into the volume of the inflatable balloon.

* * * * *